United States Patent
Kunii

[11] Patent Number: 5,420,713
[45] Date of Patent: May 30, 1995

[54] OPTICAL SCANNER

[75] Inventor: Yoshimasa Kunii, Saitama, Japan

[73] Assignee: Fuji Xerox Co., Ltd., Tokyo, Japan

[21] Appl. No.: 948,450

[22] Filed: Sep. 22, 1992

[30] Foreign Application Priority Data

Oct. 9, 1991 [JP] Japan .................. 3-290581

[51] Int. Cl.⁶ .................................. G02B 26/08
[52] U.S. Cl. .......................... 359/198; 359/200;
359/216; 359/217
[58] Field of Search ............. 359/198, 216–219,
359/781, 200, 199; 248/466

[56] References Cited
U.S. PATENT DOCUMENTS 4,623,216 11/1986 Sato et al. ................. 359/217

FOREIGN PATENT DOCUMENTS 2-230269  9/1990 Japan .
2-309066 12/1990 Japan .

*Primary Examiner*—Ricky D. Shafer
*Assistant Examiner*—James Phan
*Attorney, Agent, or Firm*—Finnegan, Henderson Farabow, Garrett & Dunner

[57] ABSTRACT

An optical scanner that includes: a rotating polygon mirror for scanning by deflecting a light beam for writing a latent image on a photosensitive body in a predetermined direction; a rotating shaft that is inserted into a hole arranged on the rotating polygon mirror; and a filling agent containing particulates for filling a gap at a fitted portion between the rotating polygon mirror and the rotating shaft. The gap can be removed by filling the particulates at the fitted portion, thus ensuring stable high-speed rotation of the rotating polygon mirror free from dynamic balance errors.

4 Claims, 2 Drawing Sheets

CONTROL CIRCUIT —35

OPTICAL SCANNER

BACKGROUND OF THE INVENTION

The invention relates to scanners for writing image information onto, e.g., a photosensitive drum in the form of a light beam in image forming apparatuses such as laser printers and digital electronic copying machines. More particularly, the invention is directed to a means for eliminating a gap present at a portion where a rotating polygon mirror and a rotating shaft member are fitted together.

An image forming apparatus such as a laser printer and a digital electronic copying machine is designed to drive light-emitting means such as LEDs by image information fed from an image information output unit such as a computer and image information in the form of a light beam obtained by scanning a document. The image forming apparatus scans a surface of an image carrying body, such as a photosensitive body, by a laser beam to write image information thereon. The image forming apparatus such as a laser printer also includes a toner image forming mechanism on the image carrying body such as a photosensitive drum, adopting an electrophotographic system similar to that used in ordinary electronic copying machines. The toner image forming mechanism is designed to form a toner image by irradiating the laser beam onto the photosensitive body to thereby form a latent electrostatic image thereon and cause toner to adhere to such latent electrostatic image. Known as a device for writing image information on the photosensitive drum by the laser beam is a scanner disclosed in, e.g., Japanese Patent Unexamined Publication No. 230269/1990. Such a conventional scanner employs a means for writing images on the photosensitive drum in the width direction thereof by deflecting a laser beam using a rotating polygon mirror.

The above-mentioned conventional scanner is such a scanner 1 as shown in FIG. 3. In the scanner 1, a laser beam outputted from a not shown light source such as a semiconductor laser is reflected by the surface of a rotating polygon mirror 11 disposed on a rotating machine 10. A photosensitive drum 9 is scanned in the width direction thereof by a laser beam 8 reflected by the rotation of the rotating polygon mirror 11. The rotating polygon mirror 11 is disposed inside an optical box 2 with the upper surface of the optical box 2 closed with a cover 5 and is designed to be driven by the rotating machine 10 at high speeds. The laser beam reflected by the surface of the rotating polygon mirror 11 forms an image on the surface of the photosensitive drum 9 by passing through an image forming lens group 6 and a glass member 7 provided at an end of the box.

In the scanner i shown in FIG. 3, a drive means such as disclosed in Japanese Patent Unexamined Publication No. 309066/1990 or the like is used to drive the rotating polygon mirror 11 at high speeds. The rotating machine 10 proposed in the above-mentioned conventional example is constructed as shown in FIG. 4. A frame of the drive means is formed of the optical box 2. In the optical box 2, a fixed shaft 15 is firmly held by a lower locking screw 16 and a rotating shaft member 20 is rotatably supported by the fixed shaft 15 through upper and lower bearings 19, 19a. On top of the fixed shaft 15 are an upper ring 17 and a pre-load spring 18 so that the bearing 19 can be held.

The rotating shaft member 20 rotatably supported by the fixed shaft 15 places the rotating polygon mirror 11 at an upper portion thereof and a rotor member 25 with a rotor magnet 30 at a lower portion thereof. The rotor magnet 30 disposed on the rotor member 25 and a stator coil 31 disposed on the optical box 2 constitute a motor 12. The rotor magnet 30 is bonded onto the lower surface of the rotor member 25. The stator coil 31 and a stator yoke 32 are placed in a grove 3 arranged on a base member 2a. A control circuit 35 is arranged for the stator coil 31. When the control circuit 35 has been switched (turned on and off) and when pulsed current has been supplied, an intense magnetic field is generated in the vertical direction (as viewed in FIG. 4) to drive the motor 12. The stator yoke 32 is designed to improve motor efficiency by changing the direction of the magnetic field applied from the stator coil 31 from downward to upward.

The drive means can adjust dynamic balance by providing an annular groove 26 on the upper surface of the rotor member 25 and mounting a counterweight 27 on the groove 26. When the number of revolutions of the drive motor 12 is 5000 to 10000, no dynamic balance adjustment is required as long as manufacturing accuracy of components involved in the radial direction of the rotor member 25 and the rotor magnet 30 is improved. However, in excess of 10000 rpm, faster operation of the rotating polygon mirror requires that vibration be reduced. To overcome this problem, the scanner must adjust dynamic balance accurately by providing a means in which an annular groove is arranged on the rotor member or the like and mounting a counterweight thereon, so that high scanning accuracy can be satisfied.

The drive motor biases the inner ring of the upper bearing 19 downward by providing not only the upper ring 17 on top of the fixed shaft 15, but also the pre-load spring 18 between the upper ring 17 and the bearing 19, in addition to the dynamic balance adjustment means. Further, for the lower bearing 19a a labyrinth seal is formed by a groove 4 provided in the base member 2a and a lower projecting member of the rotating shaft member 20, so that lubricating oil within the bearing 19a will not splash out. Between the rotor member 25 and the rotating polygon mirror 11 is a spring 23 to bias the rotating polygon mirror 11 toward an upper stepped portion 21 of the rotating shaft member 20 so that the rotating polygon mirror 11 together with the rotating shaft member 20 can rotate together.

The thus constructed rotating body, using ball bearings such as shown in FIG. 4, can be operated at the number of revolutions ranging from about 5000 to 15000. In contrast thereto, a bearing member using a kinetic pressure spindle (pneumatic bearing) dedicated to high speed rotation is suitable for the number of revolutions ranging from 20000 to 40000. Even using both types of bearings, problems are encountered at the fitted portion between the rotating shaft member 20 and the rotating polygon mirror 11.

a) If a spring 23 is interposed between the rotor member 25 and the rotating polygon mirror 11, the rotating polygon mirror fixing position is displaced at 10000 rpm or more, causing the rotating polygon mirror 11 to vibrate in some cases.

b) If a fixing means such as a screw is used to fix the rotating polygon mirror 11 on the rotating shaft member 20, too strong a torque of the screw causes the reflecting surface of the rotating polygon mirror 11 to deform, thereby impairing the flatness of the reflecting mirror. Smaller torques cause the rotating polygon mirror fixing position to be displaced, thus causing the rotating polygon mirror 11 to vibrate.

In addition to the rotating polygon mirror fixing means such as shown in items a) and b), the following techniques have also been employed.

c) If the rotating polygon mirror is fixed on the rotating shaft member by thermal fit, the rotating polygon mirror fixing position is difficult to be displaced, but the reflecting surface of the rotating polygon mirror deforms to a large degree.

d) If an adhesive is used, the adhesive strength (intermolecular force) of the adhesive is too large that the reflecting surface of the rotating polygon mirror deforms to a large degree. Such deformation is aggravated with a thinner rotating polygon mirror, which is a disadvantage.

As shown in FIG. 4, to cause the rotating shaft member to support the rotating polygon mirror, a fitted portion 22 between the rotating shaft member 20 and the rotating polygon mirror 11 has a gap (fit gap) of about 5 to 50 $\mu$m. Negative effects of this gap at the fitted portion 22 are not grave as long as the rotating polygon mirror is driven at low speeds. However, in the case of high speed operation in excess of 10000 rpm, the rotating polygon mirror fixing position is displaced in the radial direction by the gap due to centrifugal force, thermal deformation, thermal impact or the like of the rotating polygon mirror. Therefore, even if dynamic balance adjustments are made correctly on the rotating polygon mirror, the rotor member, and the like, such dynamic balance is destroyed when these members are assembled into a rotating body. Further, in the case of the fixing means using a screw or the like, strong torque is applied to the rotating polygon mirror, which produces errors on the reflecting surface of the rotating polygon mirror. This makes accurate scanning of image information difficult.

The invention has been made in view of the above problems related to the gap between the rotating shaft member and the rotating polygon mirror. Accordingly, an object of the invention is to provide a means for allowing no gap to be present at a fitted portion between the rotating shaft member and the rotating polygon mirror while using particulates to fill the fitted portion of the rotating polygon mirror and for preventing such gap from negatively affecting the operation of the scanner as a whole even when the rotating polygon mirror is rotated at high speeds. Another object of the invention is to provide a method of manufacturing such a means.

SUMMARY OF THE INVENTION

To achieve the above objects, a first aspect of the invention is applied to an optical scanner that includes: a rotating polygon mirror for scanning by deflecting a light beam for writing a latent image on a photosensitive body in a predetermined direction; a rotating shaft that is inserted into a hole arranged on the rotating polygon mirror; and a filling agent containing particulates for filling a gap at a fitted portion between the rotating polygon mirror and the rotating shaft.

To achieved the above objects, a second aspect of the invention is applied to a method of manufacturing such an optical scanner, which involves the steps of: fitting the rotating polygon mirror and the rotating shaft; injecting the filling agent containing particulates, a resin, and a solvent into the fitted portion between the rotating polygon mirror and the rotating shaft; and drying the filling agent.

As described above, the gap is eliminated by filling the particulates to the gap at the fitted portion between the rotating shaft member and the rotating polygon mirror. As a result, stable high-speed rotation of the rotating polygon mirror free from dynamic balance errors can be ensured. The particulates used in the invention serve only as a filler. Thus the particulates, not acting as an adhesive, do not negatively affect the reflecting surface of the rotating polygon mirror.

DETAILED DESCRIPTION OF THE PREFERRED EMBODIMENTS

Figure 1:
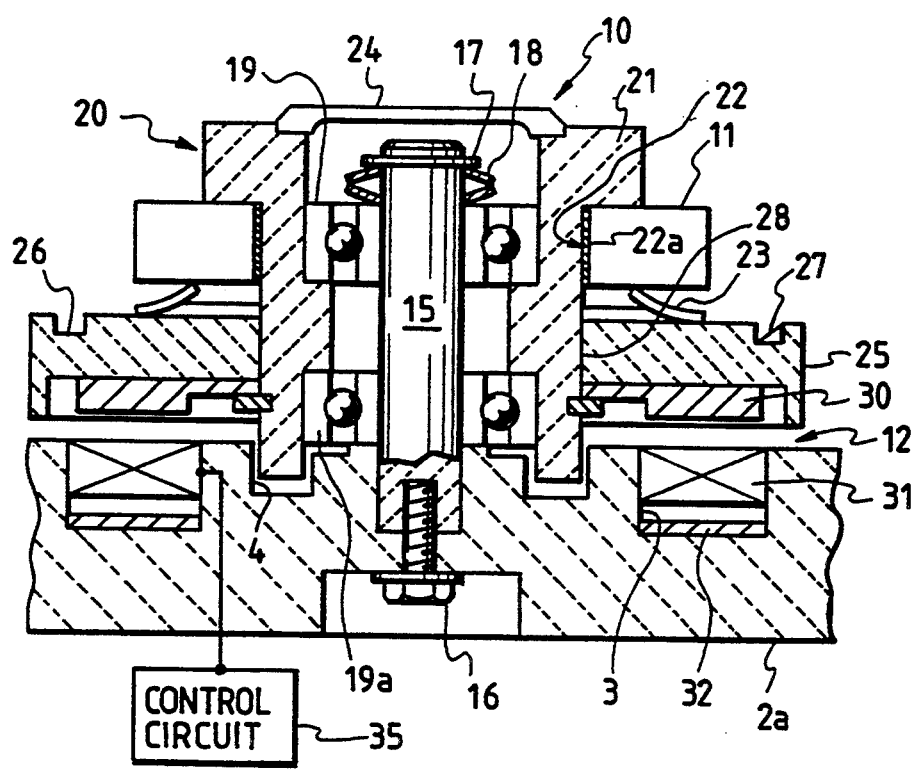
FIG. 1 is a sectional view of a rotating device to which a means for fixing a rotating polygon mirror of the invention is applied.
Figure 4:
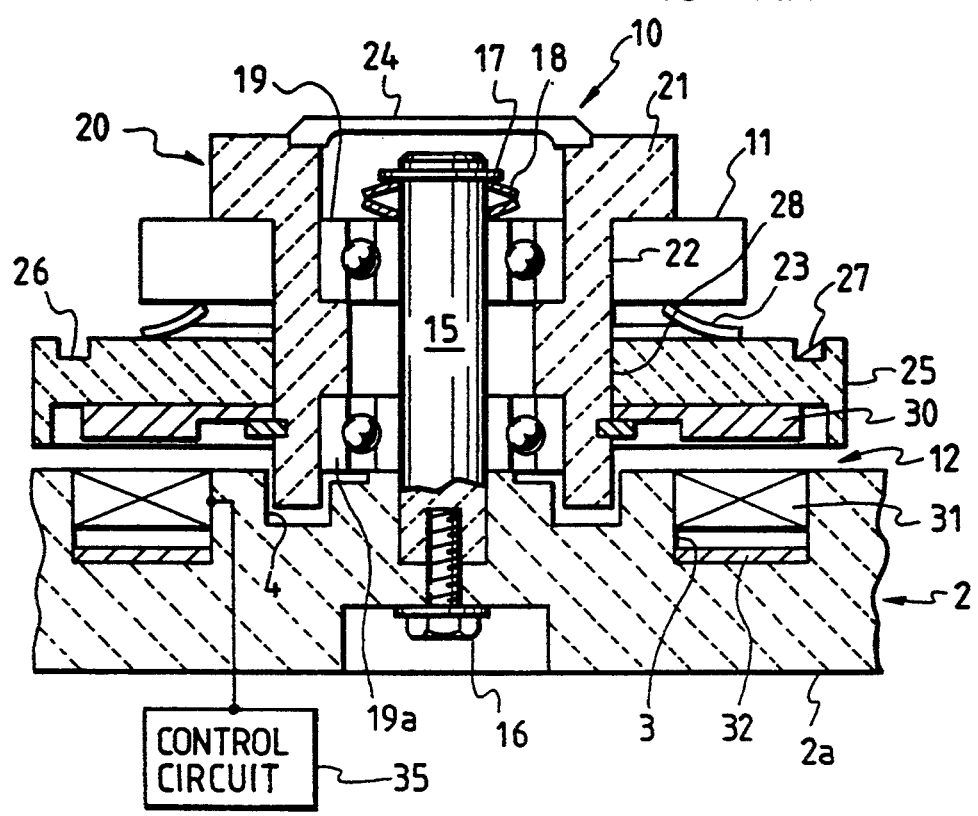
FIG. 4 is a sectional view showing a configuration of a conventional rotating machine.

The optical scanner of the invention will be described with reference to embodiments shown in the drawings. An embodiment shown in FIG. 1 is a rotating machine 10 whose construction is similar to that shown in FIG. 4. This is a case where a means for eliminating the influence of a gap from a fitted portion 22 at which a rotating polygon mirror 11 is supported by a rotating shaft member 20. In the rotating machine 10 shown in FIG. 1, two bearings 19, 19a are interposed between a fixed shaft 15 and the rotating shaft member 20. The rotating shaft member 20 is driven at high speeds by a motor formed of a rotor magnet 30 disposed on a rotor member 25 and a stator coil 31 disposed on a base member 2a.

The rotating polygon mirror 11 made of 99.99 % aluminum and disposed immediately below the upper stepped portion 21 on top of the rotating shaft member 20 is held by the rotating shaft member 20 through the fitted portion 22, the upper stepped portion 21 projecting outside. Since the respective members constituting the rotating machine 10 are described in detail with reference to FIG. 4, the description of their construction will be omitted. As described with reference to the conventional example, the fitted portion 22 has a small gap of 5 to 50 $\mu$m. The presence of such a gap allows the rotating polygon mirror 11 to be mounted on the rotating shaft member.

However, the gap at the fitted portion 22 becomes a great hindrance in maintaining the reflecting surface of the rotating polygon mirror 11 in correct conditions when the rotating polygon mirror 11 is rotated at high speeds. To overcome this problem, the invention attempts to remove the gap at the fitted portion 22 by filling the gap with particulates 22a at the fitted portion 22 at which the rotating polygon mirror 11 is mounted on the rotating shaft member 20. That is, the rotating machine 10 of the invention is characterized as employing a technique for eliminating play at the fitted portion by introducing a paint (described later) to the fitted portion between the rotating shaft member 20 and the rotating polygon mirror 11 and using the particulates 22a contained in that paint.

A. The paint having, e.g., the following composition may be used.
   a: Coloring material: Titanium white (36 vol %)
   b: Resin: Alkyd-containing MAIREN acid resin (22 vol %)
   c: Solvent: Xylene (37 vol %)
   d: Solvent: Methyl isobutyl ketone
   e: Others: Additive (2 vol %)

In the paint having the above composition titanium white used as a coloring material is a particulate whose grain size is 5 μm or less. A solution prepared by dispersing such particulates into a resin and a solvent is used.

B. In addition to the oil paint indicated in item A, various types of so-called water-soluble paints can be used in the invention. The water-soluble paints may include one in which a solution contains particulates and a water-soluble solvent. The use of a commercially available water-soluble paint in which the grain size of particulates is 5 μm or less allows the particulates contained in the paint to fill the gap at the fitted portion between the rotating shaft member and the rotating polygon mirror. It has been verified that water-soluble paints cause less deformation of the light-reflecting surface of the rotating polygon mirror than oil paints and are preferable in filling the gap at the fitted portion with the particulates.

The above-mentioned paint containing particulates is introduced into the gap at the fitted portion 22 between the rotating shaft member 20 and the rotating polygon mirror 11 at the time the rotating polygon mirror 11 is mounted on the rotating shaft member 20. The introduced paint is then dried to evaporate the solvent, so that only the particulates 22a will remain in the gap at the fitted portion. The particulates remaining in the gap at the fitted portion simply acts as a filler for the gap, thus not acting as an adhesive for bonding both members together. Therefore, as long as the paint is loaded into the gap at the fitted portion, erroneous writing of images due to negative effects of the gap at the fitted portion can be prevented even when the rotating polygon mirror is operated at high speeds.

Figure 2:
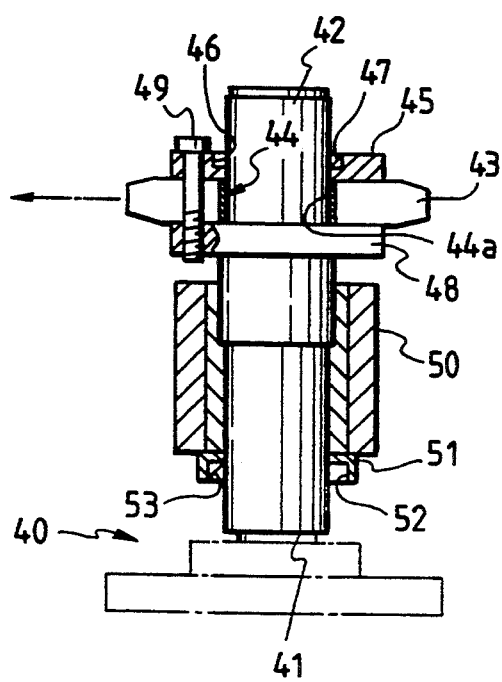
FIG. 2 is a sectional view of another exemplary rotating machine to which the rotating polygon mirror fixing means of the invention is applied.
Figure 3:
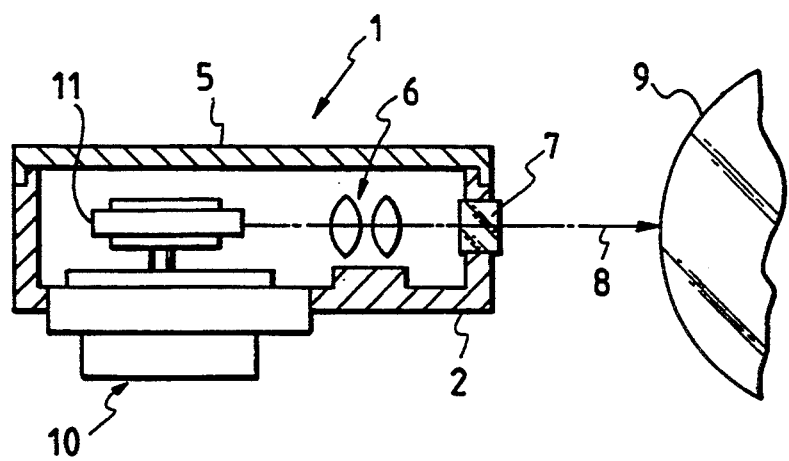
FIG. 3 is a sectional view showing a configuration of an ordinary scanner.

As described above, the paint of the invention can be applied to a rotating machine 40 shown in FIG. 2 as a means for filling the gap at the fitted portion at the time a rotating polygon mirror 43 is mounted on a rotating shaft, in addition to the case where the rotating polygon mirror 11 is firmly secured to the rotating shaft member 20 in the rotating machine 10 shown in FIG. 1. The rotating machine 40 shown in FIG. 2 is designed to support the relatively small rotating polygon mirror 43 on an upper portion of a rotating shaft 42 through two rings 45, 48, the rotating shaft 42 being rotatably supported by a shaft support portion 41. The rotating polygon mirror 43 has a plurality of holes passing through the upper and lower rings 45, 48 and is loosely fixed by attaching locking screws 49 into the holes.

Further, the rotating shaft 42 has a rotor magnet 50 through a sleeve 51 below the rotating polygon mirror 43. Below the sleeve 51 is a groove 52 provided so that a counterweight 53 can be placed on the groove 52. When the sleeve 51 and the rotor magnet 50 are mounted on the rotating shaft 42, unbalanced conditions of the shaft caused by these members can be eliminated by the counterweight 53. As described above, the rotating shaft 42 on which the rotating polygon mirror 43 has been mounted is assembled with a stator coil that is disposed so as to be coupled with the rotor magnet 50, whereby a motor can be constituted.

Known as the motor of FIG. 2 is, e.g., a motor shown in FIG. 11 in Japanese Patent Unexamined Publication No. 309066/1990. As a means for supporting the rotating shaft 42 at the shaft support section, a shaft supporting means of a type called "gas bearing" may be provided in addition to the bearings. A laser beam is reflected by the rotating polygon mirror while driving the rotating shaft 42 at high speeds by the drive motor involving the motor magnet 50 with the shaft 42 supported by the shaft support section as described above and rotating the rotating polygon mirror 43 mounted on the shaft 42.

In the thus constructed rotating machine 40 of the invention, the rotating polygon mirror 43 supported at the upper portion of the rotating shaft 42 employs a means for filling the gap at a fitted portion 44 with particulates contained in the paint by injecting the paint into the fitted portion 44 between the rotating shaft 42 and the rotating polygon mirror 43. As a means for supporting the rotating polygon mirror 43 shown in FIG. 2, one that can strongly tighten the rotating polygon mirror 43 interposed between the upper and lower rings 45, 48 with the locking screws 49 has conventionally been used. The tightening of the rotating polygon mirror 43 causes the light-reflecting surface of the rotating polygon mirror 43 to deform, thus imposing the problem of disarranging scanned image information.

To overcome this problem, the rotating machine shown in FIG. 2 is designed so that no superfluous external force is imparted to the rotating polygon mirror by allowing loose tightening with the locking screws 49 between the upper and lower rings 45, 48 and supplementing the insufficient tightening force while filling the gap at the fitted portion with the particulates 44a. Therefore, in the rotating machine involving a means for supporting the rotating polygon mirror between the two rings, no strong tightening force is required any longer to mount the rotating polygon mirror between the rings. The filling of the gap at the fitted portion with the particulates in a paint or the like contributes to preventing presence of play at the fitted portion. As described above, while causing the rotating shaft to support the rotating polygon mirror, stable high speed rotation of the rotating polygon mirror can be ensured even at speeds faster than 10000 rpm.

While the case where a paint is introduced to the gap at the fitted portion at which the rotating polygon mirror is mounted on the rotating shaft member has been described in the above-mentioned embodiment of the invention, the means for filling the gap at the fitted portion with the particulates may be applied to the portion at which the rotor member is mounted on the shaft. For example, in the case of using a means for injecting a paint containing particulates to a fitted portion 28 at which the rotor member 25 is mounted on the rotating shaft member 20 shown in FIG. 1 and filling the gap at the fitted portion with the particulates contained in the paint, the gap between the rotor member 25 and the shaft 20 can be eliminated easily, thus allowing the rotating machine to be driven without play. Therefore, the use of a means for causing the shaft member of the invention to support a disk-like member allows no negative effect of a gap to be exerted on the rotation of the rotating polygon mirror even if there is a slight gap at the fitted portion between both members.

Further, while the case where a water-soluble or oil paint containing particulates whose grain size is 5 μm or less is used as the member to be used to fill the gap at the fitted portion has been described in the invention, the solution of the invention is not limited to the paint. For example, a solution prepared by dispersing particulates whose grain size is 5 μm or less in an arbitrary kind of solvent at a high concentration so that the solution is fluid may be used as well. Still further, while the case where titanium white that can be dispersed as relatively small particulates is used has been described with respect to the above-mentioned paint, other particulates may also be used as long as their grain size is small. And the gap at the fitted portion is filled by injecting a solution containing such particulates into the gap, removing the solvent by means of, e.g., evaporation, and causing the particulates to remain at the gap.

As described in the foregoing pages, the optical scanner of the invention is characterized as filling a gap using a paint or the like containing particulates, the gap being at the fitted portion at which the rotating polygon mirror is mounted on the rotating shaft member. Therefore, the gap can be filled immediately after the rotating polygon mirror has been mounted. The gap can be removed by loading the particulates to the gap at the fitted portion between the rotating shaft member and the rotating polygon mirror, thus achieving stable high-speed rotation of the rotating polygon mirror free from dynamic balance errors. The particulates of the invention are used to only fill the gap at the fitted portion. The particulates, having no adhesive property, do not negatively affect the reflecting surface of the rotating polygon mirror.

What is claimed is:

1. An optical scanner comprising:
   a rotating polygon mirror for scanning by deflecting a light beam in a predetermined direction, said light beam writing a latent image corresponding to image information onto a photosensitive body;
   a rotating shaft being inserted into a hole arranged in said rotating polygon mirror; and
   a filling agent filling a gap at a fitted portion between said rotating polygon mirror and said rotating shaft, said filling agent containing a particulate, and said filling agent being incapable of adhesively bonding the rotating polygon mirror to the rotating shaft.

2. An optical scanner according to claim 1, wherein said filling agent further contains a resin.

3. An optical scanner according to claim 2, wherein a content of said particulate of said filling agent is greater than a content of said resin.

4. An optical scanner according to claim 1, wherein a grain size of said particulate is 5 μm or less.

* * * * *